Aug. 7, 1945.  F. S. EASTMAN  2,381,268
SCALE COMPENSATOR
Filed June 30, 1942   3 Sheets-Sheet 1

Inventor
FRED S. EASTMAN
By Reynolds & Beach
Attorneys

Aug. 7, 1945.   F. S. EASTMAN   2,381,268
SCALE COMPENSATOR
Filed June 30, 1942   3 Sheets-Sheet 2
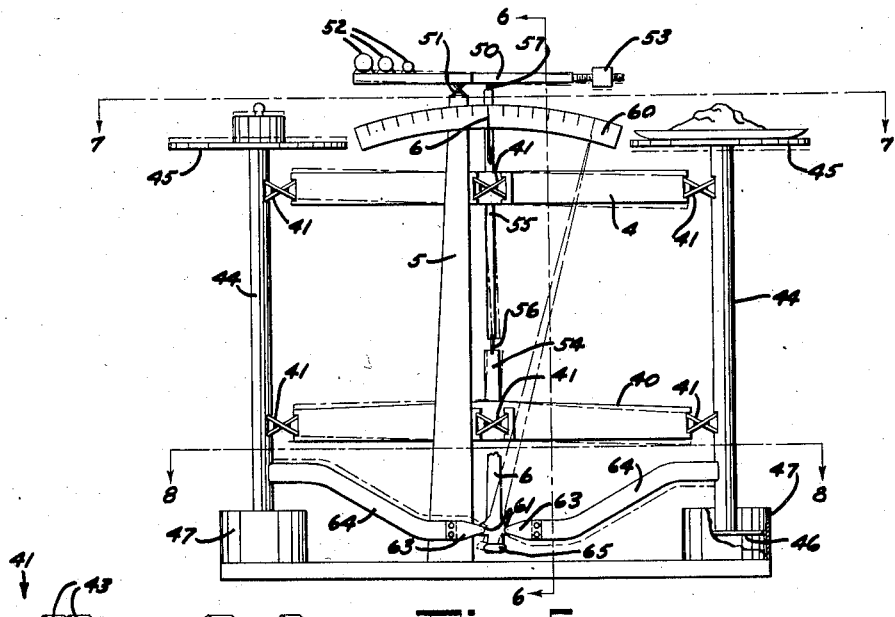
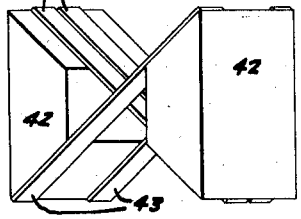
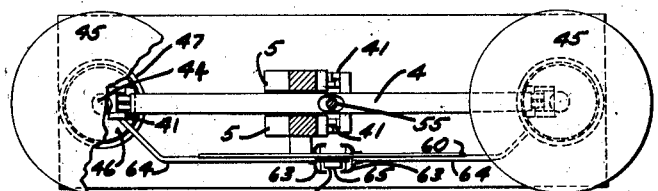
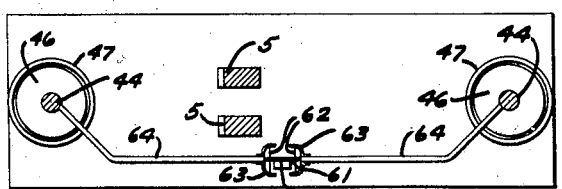
Inventor
FRED S. EASTMAN
By *Reynolds & Beach*
Attorneys Aug. 7, 1945.　　　F. S. EASTMAN　　　2,381,268
SCALE COMPENSATOR
Filed June 30, 1942　　　3 Sheets-Sheet 3
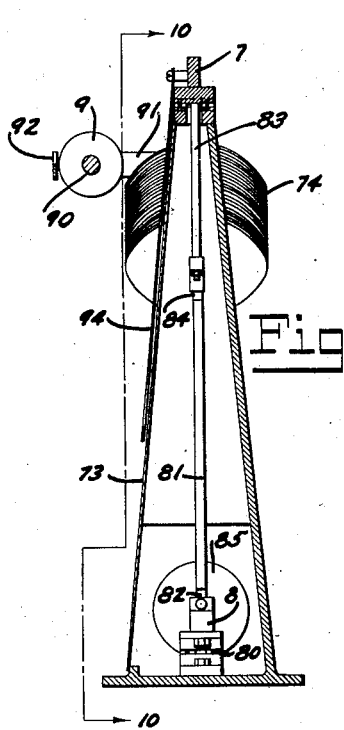
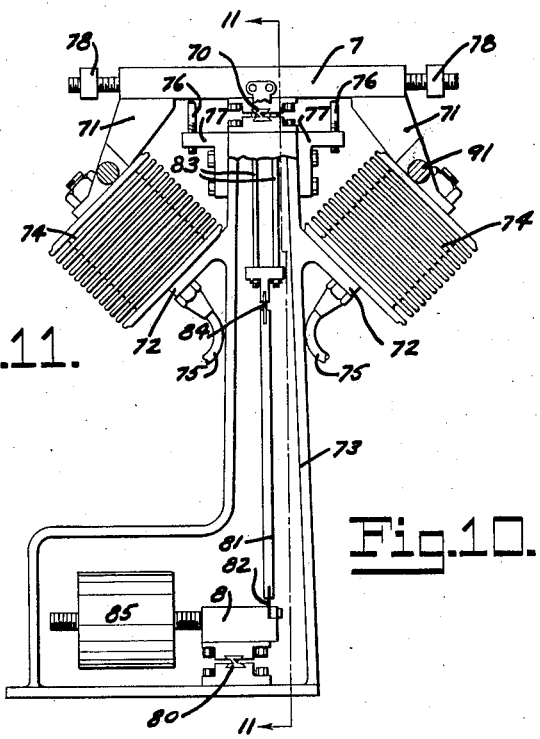
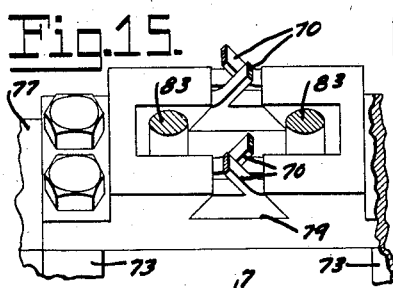
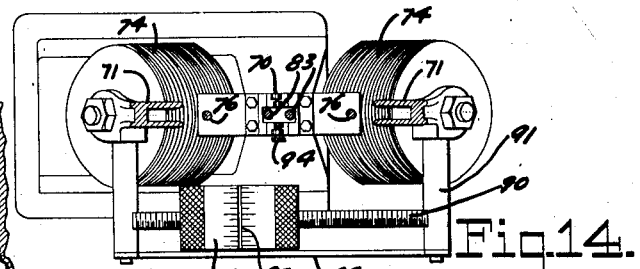
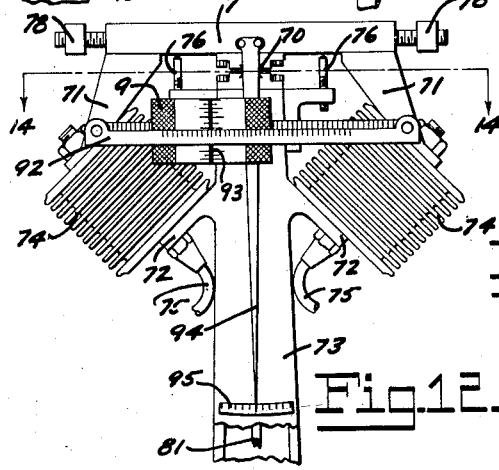
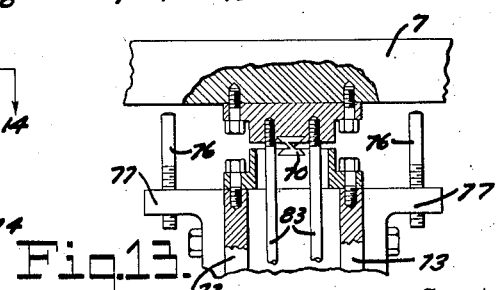
Inventor
FRED S. EASTMAN
By Reynolds & Beach
Attorneys Patented Aug. 7, 1945

2,381,268

UNITED STATES PATENT OFFICE 2,381,268

SCALE COMPENSATOR

Fred S. Eastman, Seattle, Wash.

Application June 30, 1942, Serial No. 449,071

20 Claims. (Cl. 265—54)

In most scales of the balance beam type accurate adjustment of a weight is required in a weighing operation, either by placing an equivalent weight on a scale pan balancing the material to be weighed, or by moving a weight along the balance beam, or both. In a scale of the spring type no manual adjustment is made, but such a scale has disadvantages and limitations in that it is not as accurate as the balancing weight type and the deflection for a given unbalanced weight can not be adjusted to provide measurement over different weight ranges. Heretofore the range capabilities of the balance beam scale, and the automatic weight indication of the spring scale, have not both been available in a single instrument.

In addition inaccuracies have at times been inherent in scales of either type resulting from resistance to departure of the beam from neutral position, caused either by the type of beam fulcrum employed or by the nature of the devices used to apply to the beam the loads to be measured. The resulting inaccuracies have been difficult to calculate, or to compensate by mechanical expedients.

My scale construction affords direct readings without the necessity of precisely applying or adjusting weights, thus possessing very nearly the convenience of a spring scale, but it does not depend principally upon spring balancing of the mass to be weighed, and so avoids the inaccuracy of such scales. In addition the scale sensitivity may be adjusted so that the same scale graduations may indicate, selectively, either a small unbalanced weight or a relatively large unbalanced weight.

Moreover, inherent scale insensitiveness caused by a resilient beam fulcrum resisting tilting of the beam, or tilt resistance produced by load applying mechanism, can be entirely overcome, if desired, so that the beam will tilt only in response to an unbalanced moment exerted by the load to be measured.

My invention is applied to a balance beam scale, and has its greatest usefulness in scales of the scientific type which must afford an accurate reading, frequently over a wide weight range, but it may be used advantageously in many scales for special purposes. It consists of a device for applying a moment to the beam tending either to resist or to induce its deflection, depending upon the nature of the scale mechanism and the operating characteristics desired. Further, my device may be adjustable to vary the magnitude of either type of moment for a given angle of beam tilt. Also the moment exerted upon the beam by my device will increase in substantially direct proportion to the deflection of the beam for small angles of departure, whether such moment tends to induce or to restrain its tilting.

While my device, as pointed out, may be incorporated in scales varying in capacity and details of construction, and intended for widely different purposes, its general charactistics and principle of operation are the same in each instance. The force applied may act upon the scale beam through dog-leg linkage connected to it. When the beam is in neutral position the links are in alignment, and their line of action is perpendicular to the beam and intersects its pivot axis, so that under such conditions no moment is exerted upon the beam tending either to tilt it or to restrain its tilting. The instant the beam departs from neutral position, however, the linkage buckles so that the direction of force application changes and no longer passes through the beam pivot axis. Instead one link of the dog-leg linkage integral with the beam forms a lever arm, and one component of the force applied to it, which acts perpendicular to such arm, increases progressively and substantially proportionately as the angle of beam tilt increases. If the force is applied generally toward the beam pivot axis the tendency of the moment thus produced will be to increase the angle of beam tilt, whereas, on the contrary, if the force is exerted in a direction generally away from the beam pivot axis the tendency will be to restrain tilting of the beam, thus making the scale mechanism less sensitive.

The types of scale to which my invention may be applied can be divided into two classes: one having a balance beam tilting freely upon a knife-edge fulcrum, and the other incorporating mechanism which resists tilting of the balance beam from neutral position. Such tilt resistant mechanism may be one or more flexure pivots, or resilient apparatus, such as metal bellows, by which the load is applied to the beam, or both. This second type of scale is said to have inherent resistance or stiffness. In the first type of scale, application of a force to the dog-leg linkage in a direction toward the beam pivot axis would disengage the beam from its pivot or produce an undesirable statically unbalanced condition. For maximum sensitivity of a freely tilting beam scale no moment is applied at any angle of beam tilt. To decrease such sensitivity the force should be directed generally away from the pivot axis, thus tending to increase the amount of unbalanced force required upon the scale beam to tilt it through a given angle.

Likewise the sensitivity of a scale having inherent resistance may be decreased by similarly applying through my mechanism a force acting generally away from the pivot axis. The inherent stiffness of such a scale may, however, initially be too great for measuring small weights or forces. In this event the force direction should be reversed to be generally toward the pivot axis, so that the moment created will neutralize, or counteract to a greater or less extent, the scale's inherent resistance. By this expedient just as delicate a balance can be obtained with such a scale as with a beam scale having a knife-edge fulcrum. Care must be taken in this case not to exert upon the balance beam an upsetting moment greater than the inherent resistance for any given tilted position of the beam, since the scale would then be rendered statically unstable, just as in applying to my device in a knife-edge fulcrum scale a force directed generally toward the pivot axis rather than away from it. By proper adjustment, taking into consideration the initial characteristics of the scale mechanism, any desired degree of scale sensitivity may be achieved.

It will be evident that devices operating upon this principle may be of different constructions, and the method of applying or altering the force or moment exerted on the beam may vary. Furthermore, the precise nature and the proportions of the linkage will be dictated largely by the requirements of the particular scale design and by the rate of moment increase which should occur as the scale beam tilts.

One principal object of my invention, therefore, is to regulate the sensitivity of any kind of a scale so that the same mechanism may weigh loads accurately within different predetermined ranges. The capacity of the scale may be changed from one range to another by a simple adjustment, and with no mechanical rearrangement of the principal scale components. This object may be achieved in scales either of the knife-edge fulcrum type or those having inherent resistance to tilting of the beam, and may be accomplished during a weighing operation.

Another of my principal objects is to render more sensitive a scale having inherent resistance resulting from the incorporation in its structure either of flexure pivots or of resilient beam load applying mechanism, or both.

It is also an object to accomplish the above purposes by mechanism which can be applied readily to scales of various conventional types, and the construction of which is simple, yet is readily adjustable to satisfy the requirements of a wide variety of conditions.

Other objects secured more particularly by the preferred type of mechanism which I employ will become evident from the detailed description which follows.

To illustrate the novel characteristics of my device, which are defined in the appended claims, several representative types of mechanism are shown in the accompanying drawings, but it will be understood that these are principally for descriptive purposes, and that the same principles may be applied by equivalent mechanism.

Figure 3 is a vertical section taken through part of the scale mechanism on the line 3—3 of Figure 2, while

Figure 5 is a front elevation view of a parallelogram type balance to which my invention is applied, employing flexure pivots. Figure 6 is a vertical section of the scale shown in Figure 5 on line 6—6 of that figure. Figures 7 and 8 show horizontal sections through the scale mechanism of Figure 5 taken on lines 7—7 and 8—8 of that figure, respectively. Figure 9 is a perspective view of a flexure pivot unit of the type used in the scale mechanism of Figure 5.

Figure 10 is a front elevation view of a different type of scale mechanism incorporating my invention, showing resilient metal bellows through which load is applied to the scale beam, the front cover plate and other parts being broken away to show the internal mechanism. Figure 11 is a vertical sectional view taken through the scale mechanism of Figure 10 along line 11—11. Figure 12 is a front elevation view of the upper portion of the scale mechanism shown in Figure 10. Figure 13 is a front elevation view of a portion of the same scale mechanism showing parts broken away. Figure 14 is a horizontal section of this scale on line 14—14 of Figure 12. Figure 15 is a top perspective view showing the balance beam fulcrum considerably enlarged and with parts broken away.

Figure 1:
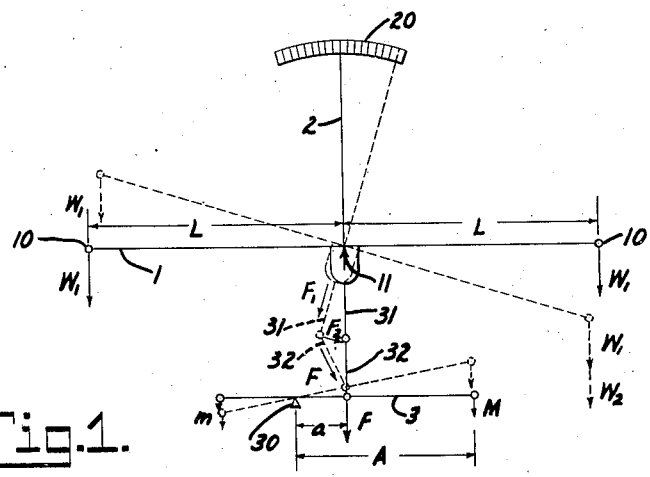
Figure 1 is a force diagram of a balance system illustrating the principle upon which my device operates.

A scale of the simple balance beam type embodies the elements indicated diagrammatically in Figure 1, including a beam 1, scale pans 10 supported one upon each end of the balance beam, and a fulcrum 11 engaging the center of the beam. The fulcrum shown is of the knife-edge type, and it defines a pivot axis about which the balance beam rocks or tilts. The degree of such tilting may be indicated by a pointer 2 mounted upon or connected to the beam so that its tip moves across a scale 20.

Assuming that the unloaded scale pans are in balance initially, the application of equal weights $W_1$ to each of them will not tilt the balance beam from its neutral position. If to one scale pan is added a further weight $W_2$, however, which is not balanced by an equal weight added to the other scale pan, the beam will be tilted from its position of rest to a position such as shown in broken lines by the unbalanced moment $W_2 \times L$, where L is one-half of the effective beam length, and this moment will continue to swing the balance beam until it reaches a limiting position. Thus if $W_1$ on the left scale pan is a standard weight, for example a 10 gram weight, it would be ascertained directly that the quantity of material $W_1$ on the right scale pan weighed exactly 10 grams. If such material weighed more than 10 grams, however, by an unknown increment $W_2$, the total weight $W_1$ plus $W_2$ would be unknown.

When adding standard weights to the left scale pan of my device in balancing the weight to be measured, the unbalanced increments may be indicated with progressively greater accuracy. Thus the resistance to deflection of the scale beam may be greatest while weights in increments of 10 grams, for example, are added until the tilt-resisting moment exceeds the unbalanced weight increment moment, so that the beam will tend to tilt back toward neutral position. Smaller weights, such as in gram increments, may now be added to place the beam in neutral position. The scale tilt resistance may then be decreased, whereupon the beam will tilt much farther from neutral position. Still smaller weights are now added to the left scale pan to place the beam again substantially in neutral position. Once more the tilt resistance may be decreased, enabling the scale beam again to tilt much farther from neutral position. Thus the tedious procedure of approximately balancing the mass to be weighed by the application of standard weights is greatly expedited in my scale mechanism, since the mass to be weighed need never be overbalanced by tentatively placing weights on the scale pan. Not only the condition of underbalance but the approximate amount is indicated.

Furthermore, it has heretofore been impossible to vary the sensitivity or the weight range of either spring or weight scales capable of indicating directly the magnitude of an unbalanced mass. Thus if the range of the scale over which the indicating pointer moved were 100 grams a mass weighing more than 100 grams could not be measured. In addition, with a scale of this capacity, the mass could not be weighed accurately to a small fraction of a gram. With my arrangement, on the other hand, masses of any weight within the capacity of the balance mechanism, rather than within the pointer scale range, may be weighed. Moreover, irrespective of the mass to be weighed such weight may be measured either with extreme accuracy, or with a lesser degree of accuracy, as desired. This is possible because with my variable weight range mechanism the mass is approximately balanced by standard weights, and only the unbalanced differential between such standard weights and the weight of the mass is indicated by a pointer deflected by beam tilt.

When a scale incorporating my device is used to weigh with very high accuracy, such, for example, as within a tolerance of a centigram, standard weights balance the mass within an increment of the order of one decigram. If accuracy to one decigram is sufficient, then the mass need be balanced by standard weights only to the nearest gram. If an error of one gram is permissible the mass may be balanced approximately by standard weights in increments of ten grams. Much time is therefore saved by balancing with standard weights to less than one tenth the accuracy of the measurement obtained. While my mechanism may be adjusted to increase or decrease the accuracy with which the unbalanced differential is indicated, the greater the accuracy required the more time will be expended in applying standard weights to balance the mass to be weighed within closer limits.

My device creates a force and applies it to the scale mechanism, which preferably has a zero balance adjustment. When the beam is in neutral position the force is directed along a line passing through the beam pivot axis, and as the beam tilts the eccentricity of the reaction line from the pivot axis increases progressively and substantially proportional to its angle of tilt. If the force remains constant, therefore, its beam tilting vector component will also increase in direct proportion to the beam tilt, and will exert a moment on the beam in the sense opposite the constant moment created by the unbalanced increment of the mass to be weighed. Consequently the beam will come to rest at the deflection where the tilt resisting moment created by my device has increased to a value equal to the substantially constant unbalanced weight increment moment.

In the diagrammatic illustration of Figure 1 a mass M on the right end of lever 3, pivoted upon fulcrum 30 exerts a constant downward force F greater than M at a point intermediate such mass and the fulcrum. At the left end of the lever is a small mass $m$ which is adjusted to counteract the weight of the longer lever portion on the opposite side of the fulcrum 30. Lever 3 and the main balance beam 1 are interconnected by force-transmitting means, such as dog-leg linkage including one link 31 rigid with beam 1 and aligned with its pivot axis, and a second link 32 pivotally connected by one end to the swingable end of link 31, and by the other end to the point of lever 3 at which force F acts.

When no force is applied to the linkage 31, 32 it will be evident that no restraint is placed upon the tilting of beam 1. Because of the pivotal end connections of link 32 any force F transmitted to it from lever 3 must act directly along this link, placing it purely in tension, in whatever tilted position beam 1 may be. When the beam is in its neutral position link 31 will be aligned with link 32, so that link 31 will be under equal tension and the line of application of force F will pass exactly through the beam pivot axis. Under such conditions no tilt resisting moment will be created. As the beam tilts the direction of link 32 will depart from alignment with link 31 and fulcrum 11, so that in such case the tension in link 32 will produce a tension vector $F_1$ in link 31 and a bending or turning moment force vector $F_2$ acting perpendicular to link 31. The tilt resisting moment then exerted upon the beam will be $F_2$ x link 31.

As previously stated, when the scale reaches equilibrium in other than neutral position of the beam the tilt resisting moment $F_2$ x link 31 must equal the unbalanced weight increment moment $W_2$ x L, but since the lengths of link 31 and of the scale beam lever arm L are constant, $W_2$ must be proportional to $F_2$. This force vector $F_2$ varies substantially in proportion to the sine of the beam tilt angle, which, for small angles, is proportional to the tile angle itself. Furthermore, the beam tilt angle is directly proportional to the deflection of pointer 2, so that such pointer deflection is directly proportional to $F_2$, and consequently proportional to $W_2$. A direct relationship is thus established between the location of pointer 2 on the scale 20 and the unbalanced weight increment $W_2$. If an unbalanced weight of unit value causes a deflection of pointer 2 across one division of scale 20, therefore, an unbalanced weight of two units will deflect the pointer over two scale divisions, and so on.

For a given sensitivity or unbalanced weight range the tilt resisting moment exerted upon the beam when the pointer moves through one division of scale 20 might be equal to the beam tilting moment created by an unbalanced weight increment of one decigram. Interpolating between the scale graduations would give an approximate reading in centigrams, and movement of the pointer across the entire length of the scale, divided as shown, would be in excess of a gram. Consequently only standard weights would have to be applied to the left scale pan in gram increments. It is evident that such scale mechanism would be quite sensitive, yet convenient to use because of the accurate weight indication as compared to the standard weights placed upon the scale pan. Despite such sensitivity and ease of operation no inaccuracies are incorporated in the scale mechanism by the use of spring devices, since the balancing action depends entirely upon weight.

If with the same scale we wish to obtain a more sensitive reading, such as accurate to one centigram, the pointer 2 would be deflected through one scale division, not by a weight unbalance of one decigram, but by a weight unbalance of only a fraction of a decigram, such as a centigram, which would require that the scale be made more sensitive by decreasing the resistance moment. In such case an approximate reading in milligrams could be obtained. If a less accurate weight is satisfactory the resisting moment may be increased to reduce the movement of the pointer corresponding to a given unbalanced weight.

The resisting moment may be adjusted in any one of several ways. The most convenient and practical method is by varying M. Thus to decrease the scale sensitivity from the most sensitive condition a second weight may be added to the right end of lever 3, which is nine times as heavy as the smaller weight, for example. The force on the right end of the lever will then be ten times the previous force, so that for the same unbalanced weight the pointer 2 would be deflected across scale 20 through only one-tenth the arc, or for an equal scale deflection the unbalanced weight increment would have to be ten times as great. Each scale division would then correspond to an unbalanced weight of one decigram rather than one centigram, so that weights in increments of one gram could be employed on the left scale pan.

For the less accurate reading M would be increased still further by addition of another weight to the right end of lever 3, so that the final weight would be one hundred times the original weight used. Each division of scale 20 would now correspond to an unbalanced weight of one gram, so that only weights in increments of ten grams need be placed upon the left scale pan, and yet the unbalanced weight increment could be measured to an approximate fraction of a gram by interpolating between the scale divisions. The same procedure of varying the weight of M may be used to adjust the scale mechanism to weigh in ounce increments or in grains. The only change necessary would be to use an appropriate weight M. For none of these changes need the position of weight M be altered, for in originally balancing the scale it should be adjusted so that without any weight M in place the scale mechanism will be precisely in balance.

Different types of arrangement for changing the tilt resisting moment by regulating the force F on link 32 may be employed. Weight M, for example, might be of fixed value, and to magnify its effect merely be shifted outward to different positions along lever 3 to increase the mechanical advantage. If such adjustment of M along the lever is relied upon entirely for force adjustment, however, the amount of displacement available for giving the desired sensitivity range would probably be prohibitive, so that in addition weights of different value would have to be used. The mechanical advantage might otherwise be increased, although the position and magnitude of mass M remained constant, by moving fulcrum 30 and the pivot between lever 3 and link 32 closer together. Increasing the length of link 31 would also enlarge the resisting moment by lengthening the lever arm on which force vector $F_2$ acts.

Figure 2:
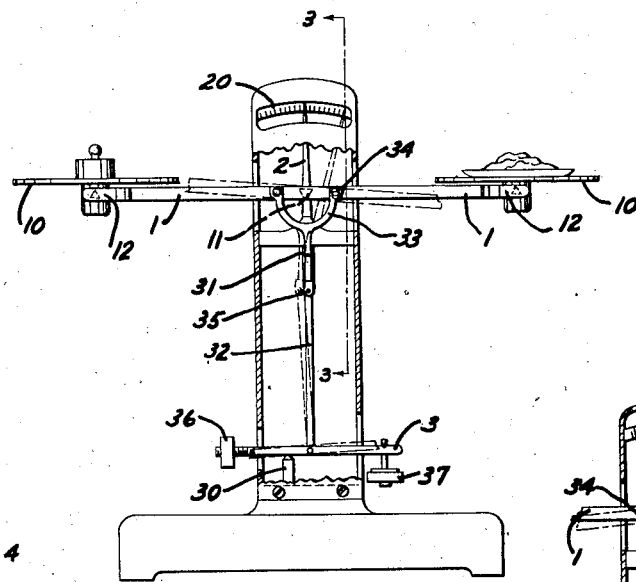
Figure 2 is a front elevation view of a conventional knife-edge fulcrum scale to which my invention has been applied, with parts broken away to show the internal mechanism.
Figure 3:
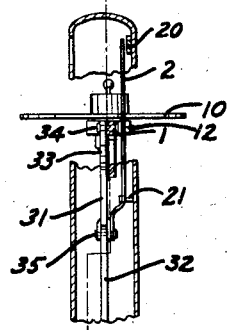
Figure 4:
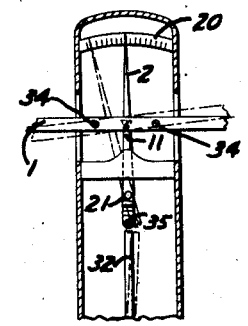
Figure 4 is a further vertical section of the same part along line 4—4 of Figure 3.

In Figures 2, 3, and 4 the application of my device to a simple balance is shown. The scale beam 1 carries weight pans 10, each supported by a conventional arrangement, such as by a knife-edge bar carried by a yoke 12. The beam tilts upon a knife-edge fulcrum 11 resting on the casing and mounted on the center of the beam, and the depending link 31 has a bifurcated end 33 pinned rigidly to the beam 1 by pins 34. The other link 32 of the dog-leg linkage is pivoted at 35 by its upper end to the lower end of link 31, and its lower end is pivoted to the lever 3. Weight 36 may be adjusted initially to compensate for the greater length of the portion of lever 3 on the right side of fulcrum 30 than on the left. Two weights 37 are illustrated, affording medium sensitivity as explained in connection with Figure 1. To increase the sensitivity the larger weight would be removed. To decrease the sensitivity another and larger weight would be added.

Pointer 2, cooperating with scale 20, instead of being carried directly by the beam as shown diagrammatically in Figure 1, is pivoted upon a pin 21 fixed on the casing, and its lower end is secured to the pivot 35. The pointer might be pivoted to link 31 at any other desirable location, or, in fact, connected to beam 1 independently of this link, as long as its portion between such pivot and pin 21 is considerably shorter than that between such pin and the tip moving across scale 20. The purpose of thus mounting the pointer independently of the beam is to effect a magnification of its angular movement over the angle of beam tilt, and this is enhanced if the distance between the fulcrum and pivot 35 is great, to afford a large amplitude of pivot movement.

In Figures 5 to 9, inclusive, a more elaborate scale mechanism is shown, generally of the parallelogram type. This scale includes upper and lower parallel balance beams 4 and 40, respectively, which are fulcrumed upon spaced flexure pivots 41. One pivot unit is secured to each of two standards 5, which, as shown in Figure 6, lie on opposite sides of the beams 4 and 40. A flexure pivot unit of the type employed is shown enlarged in Figure 9 to make clear the details of its construction. Each unit includes two tapered base blocks 42, one of which is secured to a column 5, and the other to a balance beam. These base blocks are interconnected by strips or leaves 43 of spring steel, which, to afford rigidity, are preferably four in number. The two central strips may lie alongside each other, both having one end secured, such as by soldering, welding or the like, to an inclined face of one block, and the other end similarly secured to the opposite inclined face of the other base block. The other two strips are spaced apart by the first two, and are disposed in crossed relationship to the first strips, the ends of such outer strips being secured to the other inclined faces of the two base blocks in the manner shown.

The edges of adjacent strips cannot touch each other between the blocks, for the strip arrangement described prevents bodily displacement of the base blocks transversely of the strip lengths and their relative rotation about any axis other than the intersection line of the strips. The spring leaves will bend rather readily, however, so that one block may be rotated relative to the other about the strip intersection line. All the base blocks 42 secured to standards 5 will remain stationary. The base blocks connected to beams 4 and 40 will rotate, enabling these beams to tilt about a transverse axis, but during such tilting longitudinal displacement, roll about a longitudinal axis, and vertical shifting of both beams is prevented. Their movement will be purely one of tilt, for the line of strip intersection does not shift as the base blocks rotate relatively. The interposition of such a flexure pivot unit between each standard 5 and the adjacent side of a balance beam element will distribute the load equally to the scale base.

The beams 4 and 40 have their ends connected by similar flexure pivot units 41 to spaced locations on upright reciprocating rods or posts 44. The beams 4 and 40 and the two rods 44 thus constitute the parallelogram arrangement. A scale pan 45 is mounted upon the upper end of each rod 44, and the lower end of each rod carries a damper plate 46 fitting loosely within a cylinder 47, to constitute a conventional oscillation retarding air dashpot.

My moment creating device may be applied to either of the beams 4 or 40, since these are interconnected through the medium of posts 44 to tilt in unison. Furthermore, it makes no difference whether the linkage is secured to the beam above or below the pivot axis, for the flexure pivots can take thrust in either direction without being displaced. The critical factor is whether the force is applied in a direction toward or away from the pivot axis, which determines whether the moment will decrease or increase the scale sensitivity.

In the previously described embodiment of my invention the beam was supported upon a knife-edge fulcrum, so that as the beam was tilted the scale mechanism itself did not set up a counter torque, and the condition of maximum sensitivity occurred when no supplemental moment was applied to it. In the scale of Figures 5 to 9, inclusive, however, the six resilient flexure pivots incorporated in the scale mechanism will be stressed as the beams 4 and 40 tilt from their neutral positions, and will produce a progressively increasing moment resisting tilting of the beams and tending to tilt them back to neutral position. Moreover, this inherent restoring moment increases, as the beams are tilted within reasonable limits, substantially in direct proportion to the angle of tilt. This scale mechanism, therefore, has inherent stiffness or tilt resistance. In such a scale construction the flexible strips or leaves 43 must have a reasonable amount of rigidity in order to support the scale elements and load, so that this inherent stiffness cannot be entirely eliminated by reducing the rigidity of leaves 43. For this reason it has heretofore been considered impractical to employ several flexure pivots in a delicate scale, such as a scientific balance.

By the application of my regulating mechanism to a scale of this type the inherent stiffness created by the flexure pivots may be completely counteracted and the scale made as sensitive as one of the knife-edge balance type. In such case, instead of the moment creating force being directed away from the pivot axis, as when applied to a knife-edge fulcrum scale, such as shown in Figures 1 to 4, it will be directed generally toward the beam pivot axis. The same general type of arrangement may, however, be employed to create the force and to apply it to the balance beam. Thus a lever 50 may be supported, such as by flexure pivot units 51, upon the upper ends of the standards 5. To afford stability this lever may be of cruciform plan shape, so that each transverse arm will be carried by a flexure pivot unit 51, as shown in Figure 6. On the left end of the lever 50, as shown in Figure 5, may be mounted cradles for carrying range weights 52, which conveniently may be cylindrical. These may be applied or removed to vary the sensitivity of the scale. Upon the other end of the auxiliary lever is threaded a zero balancing weight 53.

As before, the force creating lever is connected to a balance beam, in this instance the lower beam 40, by dog-leg linkage including a link 54 integral with such beam, and a second link 55, the lower end of which is flexibly connected to the upper end of link 54 by a spring leaf member 56. This second link extends upward through an aperture in beam 4, as shown in Figure 7, and its upper end is flexibly connected to lever 50 fairly close to its pivot axis by another spring leaf connection 57. These spring leaves 56 and 57 have little rigidity and hence offer slight resistance to change in angular disposition of links 54 and 55 and lever 50, but they are short enough to be capable of transmitting such compression forces between the links as may be necessary without collapsing. They do not require oiling or other attention to keep them in proper working condition, as is necessary for a pivot pin connection.

By the employment of such regulating mechanism this scale may be used either purely as a balance or as an unbalanced weight indicator. The inherent stiffness in the scale caused by the flexure pivots makes it initially suitable for use as an unbalanced weight indicating device, but the difficulty is that the relationship between beam tilt and the unbalanced weight cannot be determined easily or maintained accurately from time to time while the scale is in use. With my arrangement a known relationship can be accurately established or checked each time the scale is used.

To set the scale initially for pure balance operation all the weights 52 are removed, and weight 53 is adjusted along lever 50 until weights of known equal value on scale pans 45 are in equilibrium in all tilted positions of beams 4 and 40. Under these conditions it will be evident that the force applied by weight 53 to linkage 54, 55 will be downward, or generally toward the pivot of beam 40, creating a moment tending to produce a statically unbalanced condition. The stiffness moment in the scale caused by the resistance of the flexure pivots to tilting of the beams increases substantially in direct proportion to their angle of tilt. The unbalancing force applied to beam 40 through linkage 54, 55 will also increase substantially in direct proportion to the angle of beam tilt because of the force vector acting perpendicular to link 54 increasing with misalignment of the links 54 and 55 as the beams tilt farther, as discussed in describing the knife-edge fulcrum scale.

Initially, when the beams are in neutral position, the single compression force vector will intersect the pivot axes so that no unbalancing moment will be created. As the beams are tilted, however, the tilt resisting moment produced by the resilience of the flexure pivots will be opposed by the unbalancing moment created by the force vector acting through link 55 perpendicular to link 54. Since both of these moments increase substantially in direct proportion to the angle to beam tilt the same relationship for all tilt angles is maintained. If weight 53 is moved outward too far, of course, the moment thus created will be more than sufficient to counteract the flexure pivot resistance and will unbalance the scale so that the beams will tilt to their limit toward whichever side of neutral position a tilt may be initiated. If the weight 53 is not moved out far enough the unbalanced stabilizing moment produced by the flexure pivots will return the beams to neutral position. It will be obvious that between such two positions weight 53 may be placed so that the unbalancing moment which it exerts through linkage 54, 55 will equal exactly the aggregate tilt resisting moment produced by all the flexure pivots in combination.

If it is now desired to convert the mechanism into a delicate unbalanced weight indicating device the smallest weight 52 may be placed in its cradle. This weight will be insufficient to overbalance weight 53, thereby to reverse the direction of the force acting upon linkage 54, 55 from compression to tension, but it will lessen such force by a predetermined amount. Instead of requiring a force directed away from the beam pivot axis to counteract an unbalanced weight moment, as in the knife-edge fulcrum scale, such moment is balanced by a controlled moment residue of stiffness or tilt resistance inherent in the scale mechanism. Such partial stiffness is restored by removing a known portion of the stiffness counteracting moment by reducing the force available to create such moment. For a given weight unbalance, therefore, the tilt of beams 4 and 40 will now be limited to a definite angle, rather than tilting to their limiting position of movement as would have been the case when the inherent stiffness or resistance was completely counterbalanced.

In order to indicate the presence of an unbalanced weight and to measure its magnitude a pointer 6 is mounted for deflection along a scale 60 in proportion to the tilt of beams 4 and 40. Any of various types of mounting for this pointer may be utilized to magnify its deflection for a given beam tilt. The support illustrated includes wing projections 61 on the pointer through which pass wires 62, as shown in Figure 8. These wires extend between the bifurcations of yokes 63 on the ends of arms 64. Such arms of cantilever type project from posts 44 toward the center of the scale mechanism, and are suitably bent both in plan and elevation, as shown in Figures 5, 6, 7 and 8, to avoid interference with the various parts of the scale mechanism, and to dispose the yokes on their free ends in proper relationship to the lower end of pointer 6. Below projections 61 on the pointer is a counterweight 65 to balance the portion of the pointer above wires 62 as it swings.

Posts 44 move differentially as beams 4 and 40 tilt, and arms 64, being integral with posts 44, move in synchronism with such posts. As the right ends of the beams tilt downward, therefore, right arm 64 will move downward and left arm 64 will move upward, acting through wires 62 upon pointer wings 61 to deflect the pointer tip to the right relative to scale 60, as shown in broken lines in Figure 5. Conversely, when the left ends of beams 4 and 40 tilt downward the pointer tip will be deflected to the left along scale 60. The degree of pointer deflection will be directly proportional to the beam tilt angle, since a small angle of beam tilt will effect full scale pointer deflection.

The relationship between the smallest weight 52, the inherent stiffness of the flexure pivots, and the graduations on scale 60 will be such that movement of pointer 6 over one scale division will indicate a weight unbalance of one weight unit, such as a centigram. As in the type of scale previously described, the weight range or sensitivity may be changed readily so that deflection of the pointer over one scale division may represent a different value of weight unbalance. Thus if the medium sized weight 52, in addition to the smallest weight 52, is placed in its cradle on auxiliary lever 50 deflection of the pointer over one scale division will indicate a larger increment of weight unbalance, such as one decigram. In this example the relative masses of the smallest and medium weights, together with the spacing of their supporting cradles from flexure pivot 51, will be such as to produce a tenfold increase in the net moment opposing tilting of the beams 4 and 40. Such net moment is the algebraic sum of the inherent resistance moment and that created by the difference in force vectors of weights 52 and 53 acting perpendicular to link 54. It is likely that the force exerted upon linkage 54, 55 with two weights 52 in place will be reversed, acting upward generally away from the pivot axis of the beam 40, and placing the links in tension. In such case the moment exerted through this linkage will supplement the stiffness moment of the scale mechanism produced by the flexure pivots.

The scale may be made even less sensitive by adding the heaviest weight 52, which again will change the amount of deflection of pointer 6 which can be effected by a weight of given unbalance. Thus the proportion and location of the largest weight 52 may be such that when all three weights are in place the total moment opposing tilting of the beams is ten times that present when only two weights are in place. Deflection of the pointer 6 through a single division will now correspond to a weight unbalance of one gram. It will therefore be necessary to apply to the left scale pan weights in increments of only ten grams.

Instead of placing several weights on lever 50 it will be evident that a single weight could be used for each weight range, so that when a smaller pointer deflection for a given unbalanced weight differential is desired a relatively light weight may be removed and replaced with a heavier weight of the correct value. As previously mentioned, it would theoretically be possible, but ordinarily not practical, to use a mass of fixed weight for all weight ranges which is moved to different locations along lever 50 to vary the scale sensitivity. The arrangement described, however, is the one preferred for varying the weight range, and it will be evident that the weights to be applied may be selected to afford any desired number and relationship of weight ranges, although usually three ranges of the order suggested will be adequate.

In the scale shown in Figures 10 to 15, inclusive, another source of inherent resistance or stiffness is present, which results from the mechanism by which the load is applied to the balance beam. This source of stiffness is in addition to that produced by the beam pivot of the flexure type, which has been discussed in connection with the scale of Figures 5 to 9. Even if a knife-edge fulcrum were employed the inherent stiffness of the scale resulting from the load applying mechanism would not be eliminated.

This scale is of the type which may be used to measure relative fluid pressures, rather than weight, for example in measuring wind tunnel forces used in aerodynamic research work. The speed of air flow through the tunnel may be translated into an air pressure differential by a Pitot-static tube arrangement, which differential may be measured by such a scale. While this scale mechanism, by following the suggestions in the previously described embodiments of my invention, could be used to obtain readings over different weight ranges, in the form illustrated it is to be used only as a simple balance. Heretofore the simple balance characteristics of such a scale were impaired by the inherent resistance of the force applying mechanism.

For practical reasons the balance beam 7 is mounted upon a flexure pivot arrangement 70, shown in detail in Figure 15. The resistance to beam tilt created by this fulcrum, however, is quite small, since only a single such pivot is required instead of six flexure pivot assemblies as shown in the scale of Figures 5 to 9 inclusive. At each end of beam 7 is a downwardly inclined arm 71, parallel to brackets 72 formed symmetrically on opposite sides of the scale frame 73. The arms 71 and brackets 72 are spaced apart sufficiently to receive therebetween metal bellows 74, which have one end secured to an arm and the other to a bracket. Through conduits 75 fluid under pressure may be conducted from pressure sources to the bellows, to measure the differential between such fluid pressure sources.

The inherent stiffness of this mechanism results from the resilient resistance to expansion or contraction of the bellows 74. Thus if the fluid pressure in the right bellows shown in Figure 10 is greater than the pressure in the left bellows, the left end of beam 7 will tend to be tilted down. The greater the angle through which the beam tilts, however, the more the right bellows 74 must be stretched and the more the left bellows 74 must be compressed. If the pressure differential between the two bellows is slight, therefore, it cannot tilt the beam 7 appreciably in opposition to the strong resistance to extension and compression of such bellows, and consequently the uncompensated mechanism is too insensitive for accurate measurement of small pressure differentials.

In a pure balance mechanism, of course, the degree of beam tilt possible can be very limited, for equilibrium of the beam in its neutral position is desired. Thus positive stop pins 76 mounted in brackets 77 carried by the upper end of case 73 may restrict tilting of the beam within close limits. Preferably such pins are adjustable in these brackets to raise or lower their upper ends for varying the maximum tilt of the beam.

The principle of the mechanism employed to overcome the inherent stiffness in this type of scale mechanism is the same as that upon which the other regulating devices operate. Thus, as shown best in Figure 10, an auxiliary lever 8 pivoted upon a flexure pivot 80 is connected to one end of a link 81 by means of a flexible leaf 82, while the other end of this link is connected to a second link 83 by a flexible leaf 84. This latter link, as shown best in Figure 13, is rigidly secured to beam 7, preferably being bifurcated, if of considerable length, to resist bending when under compression load.

Since bellows 74 have a large amount of inherent resistance or stiffness, and since the mechanism is to be operated as a pure balance device rather than to indicate unbalanced forces or weights, the force creating the stiffness counteracting moment will act through linkage 81, 83 toward the beam pivot 70, to place such links in compression. This force may be exerted by a weight 85 threaded upon the end of lever 8 remote from that to which link 81 is connected, and on the opposite side of fulcrum 80 from such link. So that this weight will not be unduly heavy its center of gravity will normally be considerably farther from pivot 80 than the connection of link 81 with lever 8.

Although it is unnecessary in this instance to change the unbalancing moment for different weight or force ranges, it may be necessary periodically to adjust the force slightly, depending upon temperature conditions, for example. The procedure for adjusting the scale mechanism so that the counteracting moment produced by weight 85 through linkage 81, 83 will equal the combined resisting moment of the flexure pivot and of the bellows 74, is to move weight 85 to the left away from pivot 80 until beam 7 becomes statically unstable and tilts in one direction or the other into engagement with stop pins 76. The weight 85 is then screwed to the right until this static instability disappears, so that when the beam is tilted just slightly to one side of neutral position or the other it does not tilt farther toward the side to which it has been displaced. If, on the other hand, when shifted slightly from neutral position to each side the beam in each instance tilts back to neutral position, weight 85 has been moved too far to the right, and should be screwed slightly to the left again. If when tilted slightly to one side of neutral position the beam tends to tilt farther, whereas when tilted slightly to the other side it tilts back through neutral position to the other side, weight 85 is approximately in the correct location, but the mechanism is not in balance. To correct this condition balancing weights 78, mounted adjustably on one or both ends of beam 7, may be moved slightly in or out until in all positions of beam deflection, with no fluid pressure differential between the bellows 74, the beam will stand in the tilted position to which it is moved. The mechanism is now properly adjusted for a measuring operation.

Figures 12 and 14 show one type of arrangement to measure the differential pressure within bellows 74, but other types may be used instead. That illustrated is merely a weight movable to one side or the other of fulcrum 70, to produce a balancing moment equal to and acting in the direction opposite that created by the pressure differential of the fluid in bellows 74. This weight may be in the form of a cylindrical nut 9 threaded upon a screw 90, each end of which in turn is supported by a rod 91 screwed into one arm 71. The nut may be divided into two parts along a central plane which can be screwed into endwise engagement to lock them in place on screw 90, or at a set screw, a lock nut, or other suitable arrangement may be provided to hold the nut in a selected position, if that should be necessary.

A graduated scale bar 92 may be mounted on the ends of rods 91 alongside the path of the weight periphery, the divisions of which will be of a length with respect to the mass of weight 9 and the area of bellows 74 such that each division will indicate a certain fluid pressure differential. Any index on weight 9 may cooperate with the scale 92, but preferably the central plane of this weight will act as such index. To facilitate an accurate reading of the pressure differential thus indicated, the central periphery of the weight may be graduated at 93 to constitute, in conjunction with scale 92, a vernier calibration.

Since this mechanism is intended to act as a pure balance, and since the effect of all inherent stiffness in the mechanism can be accurately counterbalanced in the manner described, some member to indicate whether the balance beam is in its neutral position should be provided. For this purpose a long pointer 94 secured to the balance beam cooperates with a scale 95 on the frame or casing 73. For such use the graduations of scale 95 would have no function other than to indicate the degree of tilt of beam 7. It may be desirable in some instances to expedite tilting of the beam into neutral position, where extreme accuracy of measurement is not necessary. In such case weight 85 can be moved slightly to the right in Figure 10, so that some residual inherent stiffness of the flexure pivot 70 and bellows 74 will remain. In such case the beam will be in neutral position when the weight 9 is in a position to balance substantially the pressure differential of fluid within the bellows. Depending upon whether extreme accuracy or a rapid measurement is more important, therefore, weight 85 may be moved to leave more or less residual inherent stiffness, but in any case this should be slight.

If, on the other hand, the mechanism is to be used as a gauge for establishing a desired fluid pressure differential the weight 9 can be set to a position corresponding to such differential, and the acting differential can then be varied until the pointer 94 registers with the center of scale 95. Here again the amount of residual inherent stiffness may be adjusted by movement of weight 85, depending upon the tolerance within which the predetermined pressure differential is to be maintained. In fact, for such use, automatic pressure differential regulating mechanism, controlled by the tilt of beam 7, may be provided, so that when the pressure departs too greatly from the desired mean the conditions responsible for such change in pressure will be corrected automatically, whereupon the pressure differential will return to that for which weight 9 has been set.

The construction of the flexure pivots used in the mechanism of Figures 10 to 15 differs somewhat from that shown in Figures 5 to 9, although they function in the same manner. In this instance each pivot 70 includes a spring leaf section integral with dovetail base portions. One base is pressed into a dovetail slot 79 formed in the upper end of standard 73 or in a cap block secured to it. As shown in Figure 13, the upper bases of these flexure pivot members are pressed into dovetail slots in beam 7 or in a block secured to it. The pivot elements are arranged so that the two central leaves are parallel and the two outer leaves are parallel as shown in Figure 15, similar to that of the flexure pivot strips in the previously described scale mechanism.

What I claim as my invention is:

1. Scale mechanism comprising a balance beam, means for applying to said beam a force to be measured and producing a tilting moment thereon, means for exerting upon said beam a force, constant in all tilted positions thereof, along a line intersecting the beam's pivot axis when in neutral position, thereby creating no moment thereon, but acting eccentrically of the beam's pivot axis in tilted positions thereof, for exerting a moment thereon in tilted positions, and means for adjusting said second means to vary the force exerted thereby while the direction and eccentricity of the force application for various tilted positions of the beam remain unchanged, for altering the moment exerted upon said beam for a given angle of beam tilt.

2. Scale mechanism comprising a balance beam, means for applying to said beam a force to be measured and producing a tilting moment thereon, a link pivotally connected to said beam and directed along a line intersecting the beam's pivot axis when in neutral position, but swingable relative to said beam as it tilts to be directed eccentrically of the beam's pivot axis, means supporting said link for lengthwise displacement during such swinging thereof, and constant force means applying a force to said link generally lengthwise thereof creating no moment on said beam when in neutral position, but operable to exert a moment on said beam in tilted position thereof.

3. Scale mechanism comprising a balance beam, means for applying to said beam a force to be measured and producing a tilting moment thereon, a link pivotally connected to said beam and directed along a line intersecting the beam's pivot axis when in neutral position, but swingable relative to said beam as it tilts to be directed eccentrically of the beam's pivot axis, weight means applying a force generally lengthwise along said link for creating no moment on said beam when in neutral position, but operable to exert a moment on said beam in tilted position thereof increasing progressively with increase in the angle of beam tilt, and means for adjusting said weight means by predetermined increments of substantial magnitude to alter correspondingly the force exerted upon said link lengthwise thereof by said weight means, thereby to vary the moment exerted upon said beam in a given tilted position thereof.

4. Scale mechanism comprising a balance beam, means for applying to said beam a force to be measured and producing a tilting moment thereon substantially constant for small angles of beam tilt, dog-leg linkage connected to said beam including one link substantially perpendicular to said beam, and having one end rigid with the central portion thereof, and a second link having one end pivoted to the free end of said first link, a lever connected to the other end of said second link, and a weight acting upon said lever to create a constant force in all tilted positions of said beam, applied to said second link for producing a moment upon said first link when said balance beam is tilted from neutral position increasing progressively with increase in the angle of balance beam tilt.

5. Scale mechanism comprising a balance beam, means for applying to said beam a force to be measured and producing a tilting moment thereon substantially constant for small angles of beam tilt, dog-leg linkage connected to said beam including one link substantially perpendicular to said beam and having one end rigid with the central portion thereof, and a second link having one end pivoted to the free end of said first link, a lever connected to the other end of said second link, a weight acting upon said lever to create a constant force in all tilted positions of said beam, applied to said second link for producing a moment upon said first link, when said balance beam is tilted from neutral position, increasing progressively with increase in the angle of balance beam tilt, and quickly operable means to alter by predetermined increments of substantial magnitude the force created by said weight and lever for application to said second link, thereby to vary the moment exerted upon said first link for a given angle of beam tilt.

6. Scale mechanism comprising a balance beam supported on a knife-edge fulcrum, means for applying to said beam a force to be measured and producing a tilting moment thereon of substantially constant value for small angles of beam tilt, weight means to apply to said beam a moment of known value opposing the moment created by said first means, approximately equal thereto, and of substantially constant value for small angles of beam tilt, and compensating linkage for exerting a constant force acting through a lever arm lengthening progressively as the angle of beam tilt increases to produce upon said beam a further moment increasing progressively with increase in the angle of beam tilt corresponding to the lengthening of such lever arm, for establishing a tilted equilibrium position of said beam at the angle of tilt where the moment created by said compensating linkage is equal to the difference in moment produced by said first two means.

7. Scale mechanism comprising a balance beam, means for applying to said beam a force to be measured and producing a tilting moment thereon of substantially constant value for small angles of beam tilt, means to apply to said beam a moment of known value opposing the moment created by said first means, approximately equal thereto, and of substantially constant value for small angles of beam tilt, and compensating means incorporating a plurality of weights for exerting upon said beam a moment increasing substantially in direct proportion to the angle of tilt of said beam from neutral position, for establishing a tilted equilibrium position of said beam wherein the moment exerted upon said beam by said compensating means is equal to the difference in moment exerted upon said beam by said first two means, and means supporting said weights for ready placement or removal of a weight or weights of known value during tilting of the beam in the course of a weighing operation for adjusting said compensating means by predetermined increments of substantial magnitude to alter the moment exerted thereby on said beam for a given angle of beam tilt, thereby to vary the sensitivity of said scale mechanism.

8. Scale mechanism comprising a balance beam, means for applying to one end of said beam a force to be measured, and producing a tilting moment thereon of substantially constant value for small angles of beam tilt, a weight of known value upon the other end of said beam producing a moment of substantially constant value for small angles of beam tilt, opposing the moment exerted by said first means, and approximately equal thereto, and compensating means, including a plurality of weights for exerting upon said beam a moment increasing progressively with increase in the angle of beam tilt from neutral position for establishing an equilibrium in a tilted position of said beam, one of said weights being capable of being rendered individually ineffective to exert such a moment during tilting of the beam in the course of a weighing operation for varying by a predetermined increment of substantial magnitude the moment exerted by said compensating means at a given angle of beam tilt.

9. A parallelogram scale comprising upper and lower balance beams, an upright standard alongside said balance beams, flexure pivot means supporting said beams from said standard, two upright posts, flexure pivot means connecting one post to corresponding ends of the upper and lower beams, flexure pivot means connecting the other post to the other corresponding ends of said upper and lower beams, dog-leg linkage including a first link having one end integral with and projecting perpendicularly from the central portion of one of said beams, and a second link flexibly connected to the free end of said first link, and means to exert a force on said second link, thereby to produce a moment upon said first link when said beams are tilted from neutral position, such force acting toward the fulcrum of the beam to which said linkage is connected, thereby to produce a moment opposing the moment created by said flexure pivots resisting tilting of said beam.

10. Scale mechanism comprising a balance beam, means to apply to said beam a force to be measured and producing a tilting moment thereon, means applying to said beam a constant force acting through an effective lever arm which increases progressively in length as the angle of beam tilt increases, thus exerting upon said beam a moment progressively increasing with increase in the angle of beam tilt, for establishing an equilibrium of said beam, acted upon by such two moments, at a given angle of tilt, and means operable to adjust said second means to vary the force applied thereby to the beam, thus to alter the value of the moment exerted thereby on said beam for any given angle of beam tilt, and thereby to vary the rate at which the moment exerted on the beam by said second means changes with the angle of beam tilt.

11. Scale mechanism comprising a balance beam, means to apply to said beam a force to be measured and producing a tilting moment thereon, means applying to said beam a constant force acting through an effective lever arm which increases progressively in length as the angle of beam tilt increases, thus exerting upon said beam a moment progressively increasing with increase in the angle of beam tilt, for establishing an equilibrium of said beam, acted upon by such two moments, at a given angle of tilt, and quickly adjustable means operable to adjust said second means by predetermined increments of substantial magnitude to vary the force applied thereby to the beam, thus to exert an equal moment on said beam at an angle of beam tilt a plurality of times as great as such given angle, and thereby to vary drastically the rate at which the moment exerted on the beam by said second means changes with the angle of beam tilt.

12. Scale mechanism comprising a balance beam, means to apply to said beam a force to be measured and producing a tilting moment thereon, weight means for producing a constant force, leverage means applying to said beam the force of said weight means through an effective lever arm which increases progressively in length as the angle of beam tilt increases, thus exerting upon said beam a moment progressively increasing with increase in the angle of beam tilt, for establishing an equilibrium of said beam, acted upon by such two moments, at a given angle of tilt, and means for adjusting said weight means by predetermined increments of substantial magnitude to vary correspondingly the force applied thereby to said leverage means, thus to alter the value of the moment exerted on said beam for any given angle of beam tilt, and thereby to vary the rate at which the moment exerted on the beam by said leverage means changes with the angle of beam tilt.

13. Scale mechanism comprising a balance beam, means to apply to said beam a force to be measured and producing a tilting moment thereon, weighted tilt control means exerting on said beam a moment which increases progressively as the angle of beam tilt increases, for establishing an equilibrium of said beam, acted upon by such two moments, at a given angle of tilt, and regulating means operable during tilting of the beam in the course of a weighing operation to adjust the magnitude of the weight incorporated in said tilt control means to alter the moment exerted thereby upon said beam for a given angle of beam tilt, thereby to vary the sensitivity of said scale mechanism.

14. Scale mechanism comprising a balance beam, bellows for applying to said beam a force, including the pressure of fluid therein to be measured, said bellows being stressed by tilt of said beam to create a moment opposing such tilt, and means operable by tilting of said beam to exert thereon a moment proportionate to that created by the stress on said bellows and in the sense tending to tilt said beam.

15. Force measuring mechanism comprising a balance beam, a support therefor, a pair of resilient bellows, one bellows being interconnected between said support and one end of said beam and the other bellows being interconnected between said support and the other end of said beam, means for supplying fluid to each of said bellows from a different source of fluid under pressure, the differential in pressure of the fluid in said two bellows exerting a moment upon said beam tending to tilt it, and deflection of said bellows caused by tilting of said beam creating a moment opposing such tilting, and means operable by tilting of said beam to exert thereon a moment substantially equal to the moment created by deflection of said bellows in various tilted positions of said beam, and counteracting such bellows moment by tending to tilt said beam.

16. Scale mechanism comprising a balance beam, means for applying to said beam a force to be measured and producing a tilting moment thereon, a non-resilient elongated member connected to said beam and directed along a line intersecting the beam's pivot axis when in neutral position, but swingable relative to said beam as it tilts to be directed eccentrically of the beam's pivot axis, means supporting said elongated member for lengthwise displacement during such swinging thereof, and means applying a force to said elongated member at a location, in all tilted positions of said balance beam, substantially in the vertical plane in which the beam's pivot axis lies, and directed generally lengthwise of said elongated member, creating no moment on said beam in balanced position but operable to exert a moment on said beam in tilted positions thereof.

17. Scale mechanism comprising a balance beam, means for applying to said beam a force to be measured and producing a tilting moment thereon, a rigid link having one end pivotally connected to said beam and directed along a line intersecting the beam's pivot axis when in neutral position but swingable relative to said beam as it tilts to be directed eccentrically of the beam's pivot axis, means supporting the other end of said link for displacement rotationally and lengthwise of said link during such swinging thereof but in all tilted positions of said balance beam restraining appreciable movement of such link end transversely of the link from a location substantially in the vertical plane in which the beam's pivot axis lies, and weight means applying to the end of said link restrained from appreciable movement out of substantially such vertical plane by said supporting means a force directed generally lengthwise of said link creating no moment on said beam in balanced position but operable to exert a moment on said beam in tilted positions thereof.

18. Scale mechanism comprising a balance beam, means for applying to said beam a force to be measured and producing a tilting moment thereon substantially constant for small angles of beam tilt, dog-leg linkage connected to said beam including one link substantially perpendicular to said beam and having one end rigid with the central portion thereof, a second link, pivot means connecting one end of said second link to the free end of said first link, to guide said links for relative swinging movement but restraining relative lengthwise movement thereof, and constant force means applying a force to said second link generally lengthwise thereof in all positions thereof for producing a moment upon said first link, when said balance beam is tilted from neutral position, increasing progressively with increase in the angle of balance beam tilt.

19. Scale mechanism comprising a balance beam, resilient means engaging said beam and tensioned by tilt thereof to exert a moment on said beam resisting such tilt, a link operatively connected directly to said beam, a second link operatively connected to said first link for disposition in alignment therewith when said resilient means are unstressed, pivot means guiding said second link for movement into disaligned relationship with said first link when said resilient means are stressed, force applying means operable to exert a force on said second link adjacent to said pivot means for exerting upon said beam an upsetting moment acting in the sense opposite to the restraining moment produced by said resilient means as the beam tilts, and means supporting said force applying means enabling adjustment thereof to vary the force applied to said second link during tilting of said balance beam in the course of a weighing operation.

20. Scale mechanism comprising a balance beam, means for applying to said beam a force to be measured and producing a tilting moment thereon, dog-leg linkage including one rigid link having one end rigid with said beam, and a second rigid link, and means applying a compression force to said second link remote from said first link and directed generally lengthwise of said second link, said second link being engaged with said first link for exerting a force on said first link generally lengthwise thereof and acting at an angle thereto increasing progressively from zero in accordance with increase in the degree of balance beam tilt from balanced position, to produce a progressively increasing moment upon said balance beam tending to increase the tilt thereof away from neutral position.

FRED S. EASTMAN.